United States Patent [19]

Dorn

[11] Patent Number: 5,499,694

[45] Date of Patent: Mar. 19, 1996

[54] SELF PROPELLED PASSENGER LIFT VEHICLE

[75] Inventor: Russell J. Dorn, Aurora, Colo.

[73] Assignee: Stewart & Stevenson Power, Inc., Commerce City, Colo.

[21] Appl. No.: 290,690

[22] Filed: Aug. 15, 1994

[51] Int. Cl.[6] ........................................ B66B 9/08
[52] U.S. Cl. .................. 187/200; 414/921; 244/137.2
[58] Field of Search .................... 187/200, 223, 187/224, 300; 414/921, 495, 540, 474, 537; 182/141; 244/137.2, 137.1

[56] References Cited

U.S. PATENT DOCUMENTS

| | | | |
|---|---|---|---|
| 4,176,732 | 12/1979 | Nordskog | 187/9 E |
| 4,662,809 | 5/1987 | Sturtz et al. | 414/340 |
| 4,971,510 | 11/1990 | Houle | 414/495 |
| 5,096,018 | 3/1992 | Dickinson, Jr. | 182/63 |
| 5,105,915 | 4/1992 | Gary | 414/495 |
| 5,154,569 | 10/1992 | Eryou et al. | 414/495 |
| 5,205,697 | 4/1993 | Getty et al. | 414/341 |
| 5,401,135 | 3/1995 | Stoen et al. | 414/921 |

FOREIGN PATENT DOCUMENTS 0444386  9/1991  European Pat. Off. .............. 414/921

*Primary Examiner*—Kenneth Noland
*Attorney, Agent, or Firm*—John E. Reilly

[57] ABSTRACT

A self-propelled passenger lift vehicle for transporting a mobility impaired passenger between a first location and first elevation and a second location and second elevation against an aircraft fuselage adjacent an aircraft door is disclosed. The vehicle comprises in combination a wheeled frame, a generally horizontal platform movably mounted on said frame having a leading edge portion and a support portion for supporting the passenger, a drive motor connected to at least one of the wheels for moving said vehicle from said first location to said second location, a brake mechanism connected to the at least one wheel for controllably stopping and preventing wheel rotation, and a position sensor in the leading edge portion of the platform for sensing the presence of the aircraft fuselage. The position sensor automatically actuates the brake to lock the drive wheel upon sensing contact with the aircraft fuselage. This feature minimizes damage to the aircraft due to operator error.

20 Claims, 4 Drawing Sheets

SELF PROPELLED PASSENGER LIFT VEHICLE

BACKGROUND AND FIELD OF INVENTION

This invention relates generally to a passenger carrying vehicle and particularly to a self-propelled vehicle especially used to transport mobility impaired passengers such as a wheelchair bound individual between an airport gate at ground level and an aircraft doorway at a different elevation.

In the past there have been various vehicles designed to transport disabled passengers to and from aircraft. One such design is disclosed in U.S. Pat. No. 4,176,732, issued to Robert A. Nordskog. The Nordskog design is an enclosed cabin which can be moved and elevated by a modified conventional forklift vehicle. The forklift vehicle controls are relocated to the interior of the cabin so that the operator is inside along with the passenger. Although the cabin has a cushioned bumper around its lower margins, the operator must take great care in positioning the cabin against the aircraft to prevent damage to the aircraft skin.

Another design is disclosed in U.S. Pat. No. 5,205,697 issued to Getty et al. This design includes a self-propelled steerable vehicle and a separate compartment for the operator containing steering, braking, motive and lift assembly controls. The operator's position is below and to the rear of the passenger compartment which allows the operator visual control of the approach to aircraft's fuselage. An extendable ramp from the wheelchair platform is used to extend into the open doorway of the aircraft. Again, there is no provision for automatically stopping forward movement of the vehicle when in comes in contact with the aircraft.

U.S. Pat. No. 4,971,510 issued to Houle discloses another design wherein there is a cab and a separate holding compartment for persons in wheelchairs. Both the holding compartment and the cab for the operator are elevated and lowered by the operator of the unit. An extendable platform extends from the holding compartment to form a bridge between the cab and the aircraft door. An automatic control for the vehicle motor restricts movement of the vehicle frame to a slow speed whenever the cab is raised above the ground level, thereby permitting the frame and the vehicle to be "inched" into position on the doorsill of the aircraft.

U.S. Pat. No. 5,096,018 issued to Dickenson, discloses an apparatus for securing a "man basket" or cage to the tines of a fork-lift.

U.S. Pat. No. 4,662,809 issued to Sturtz et al discloses an automatic level device forming a part of a motor platform to align a lift device with the aircraft. An umbilical cord with liquid mercury is used to adjust the level of the platform an align the platform with the aircraft.

U.S. Pat. No. 5,105,915 issued to Gary discloses a wheelchair lift particularly for use as an adjustable seating arrangement for people in wheelchairs.

U.S. Pat. No. 5,154,569 issued to Eryou et al discloses a lift device for transferring wheelchair passengers to commuter aircraft which includes a bridge formed between the platform and the door of the aircraft together with stairs that can be used by able persons to board the aircraft.

A particular problem with all of the conventional passenger lift vehicle designs is that substantial damage to the aircraft can result if the operator positions the device against the aircraft fuselage with too much force. Alternatively, damage can result to the aircraft if the vehicle is maneuvered forward when the cabin or other platform is already positioned beside the aircraft. Accordingly, there is a need for a vehicle which automatically senses the presence of the aircraft fuselage and prevents forward movement of the vehicle upon contact therewith.

SUMMARY OF THE INVENTION

It is an object of the present invention to provide an improved passenger lift vehicle which minimizes the potential for aircraft damage upon contact therewith.

It is another object of the present invention to provide a wheelchair lift vehicle which includes sensors which automatically sense contact with the aircraft fuselage.

It is another object of the present invention to provide a lift vehicle which automatically prevents forward movement of the vehicle upon sensing contact with the aircraft.

The vehicle in accordance with the present invention is a self-propelled passenger lift vehicle for transporting a mobility impaired passenger between a first location, typically at ground elevation, and a second location at an elevation adjacent to an aircraft fuselage in registry with an aircraft door. The vehicle comprises a frame supported on a plurality of wheels, a generally horizontal, vertically movable platform movably mounted on the frame having a leading edge portion and a support portion for supporting a passenger, and a position sensing device mounted on the leading edge portion of the platform for sensing the presence of the aircraft fuselage. A drive motor is connected to at least one of the vehicle wheels for moving the vehicle between the two locations. A brake means is connected to at least the drive wheel for controllably stopping and preventing wheel rotation. The position sensing device automatically actuates the brake means to lock at least the drive wheel upon sensing contact with the aircraft fuselage. The vehicle also includes an elevating mechanism mounted on the frame and connected to the platform for controllably raising and lowering the platform between the ground elevation and the elevation of the aircraft door.

The brake means preferably includes a pair of hydraulically released, spring actuated disc brake calipers mounted on a transaxle assembly connected to a pair of drive wheels. One brake caliper operates a disc fixed to the axle for each drive wheel. The hydraulically released, spring actuated disc brakes are released by hydraulic pressure from a pressurized hydraulic fluid supply connected to the calipers through an electrical solenoid valve. The solenoid valve, when energized, supplies hydraulic fluid under pressure to the calipers to release them. When the solenoid is deenergized, it isolates the hydraulic supply from the brake calipers and bleeds hydraulic fluid from the calipers.

As previously stated, a position sensing device is provided in or on the leading edge portion of the platform for sensing the presence of the aircraft fuselage. This position sensing device is preferably a pressure sensitive switch embedded or enclosed in a soft bumper cushion along the leading edge of the platform. For example, the switch may be a set of normally open electrical contacts mounted in a flexible sleeve. The switch is connected electrically to the power supply to the solenoid valve in the hydraulic fluid supply line to the brake calipers. The position sensing device deenergizes the solenoid valve to automatically actuate the brake and thus lock the drive wheels upon sensing contact with the aircraft fuselage.

The drive motor is preferably an electrically powered hydraulic motor connected to one or more drive wheels through a hydrostatic transmission and transaxle assembly.

The position sensing device may also be electrically connected to the drive motor so that the drive motor and solenoid vales to the brake calipers are deenergized simultaneously upon sensing contact between the platform's leading edge and the aircraft fuselage.

The vehicle in accordance with the present invention provides an economical, effective and safe means for transporting and positioning an ability impaired passenger onto or off of an aircraft while minimizing the damage to the aircraft from operator error. The vehicle in accordance with the present invention is especially useful on commuter type aircraft or other aircraft in small airports where jet ways are unavailable.

The above and other objects, features and advantages of the present invention will become more readily appreciated and understood from a consideration of the following detailed description of preferred and modified forms of the present invention when taken together with the accompanying drawings in which:

DETAILED DESCRIPTION OF PREFERRED EMBODIMENT

Figure 1:
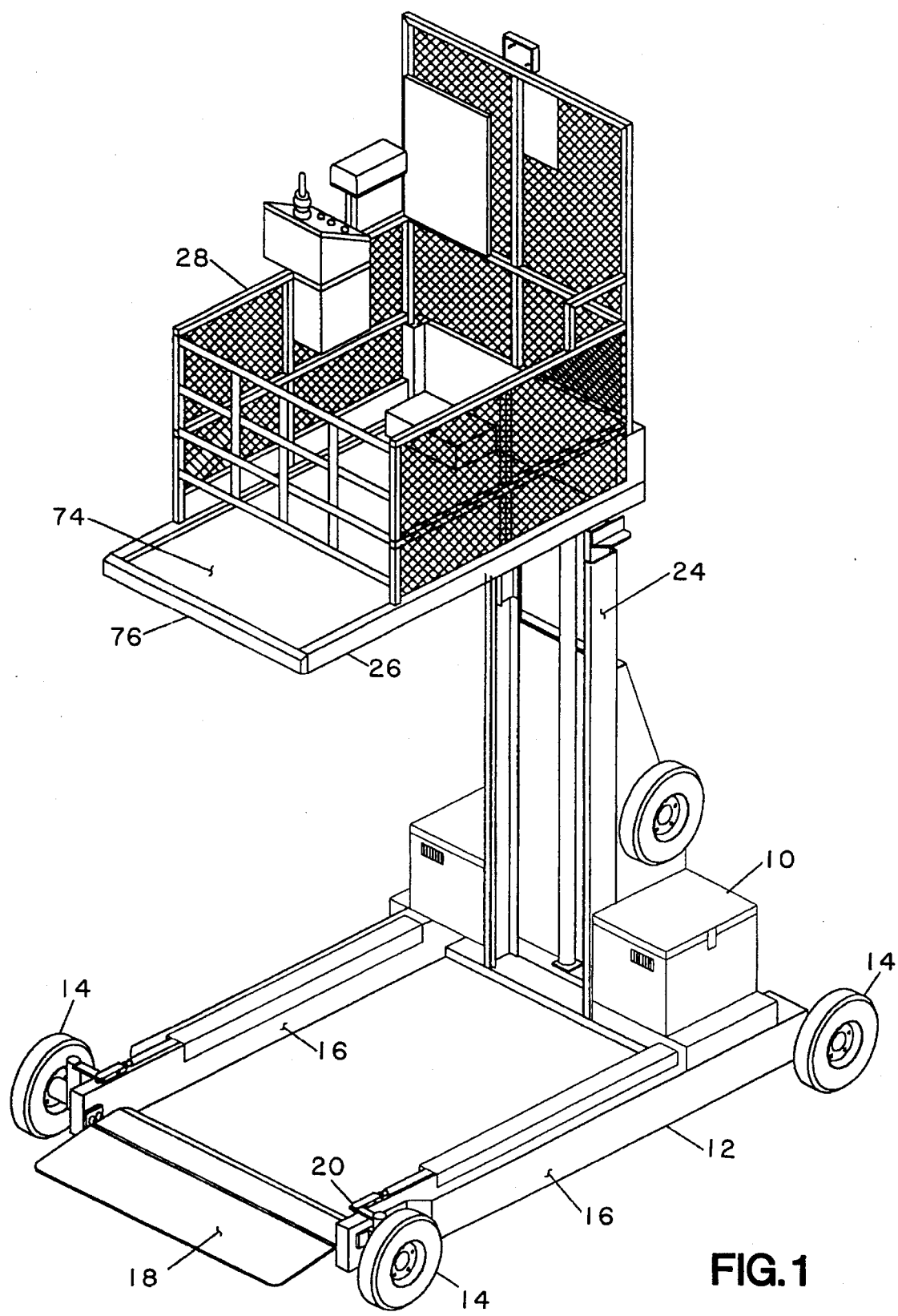
FIG. 1 is a perspective view of the vehicle in accordance with the present invention with the platform in a raised position.

Referring now to the drawings, the preferred embodiment of the lift vehicle 10 in accordance with the present invention is shown in a perspective view in FIG. 1. The self-propelled passenger lift vehicle 10 comprises a generally U-shaped frame 12 which is generally rectangular in cross-sectional shape, and is supported on four wheels 14. The frame 12 includes two parallel spaced members 16 having front and rear ends separated at their front ends by a pair of tiltable ramp plates 18 and 20. A transaxle support cross member 22 joins the parallel members 16 at the rear ends.

The spaced frame members 16 and transaxle support member 22 are preferably I-beam or box-shaped steel members welded together to form a rigid square U-shaped rigid structure. The tiltable ramp plates 18 and 20 are pivotally mounted between the front ends of the spaced frame members 16 to provide a smooth ramp between a horizontal platform 26 and the ground. The ramp plates are shown in the raised position in FIG. 1, and in the lowered position in FIG. 2.

A conventional elevating mechanism 24 is bolted, welded, or otherwise fixedly mounted to the transaxle support member 22. The horizontal platform 26 is fixed to the movable portion of the elevating mechanism 24. The elevating mechanism 24 is of a conventional design such as may be found on a variety of commercially available forklift vehicles. The elevating mechanism 24 is controlled by the vehicle operator to raise and lower the horizontal platform 26.

A cage 28 comprised of a steel or aluminum railing arrangement is fixed to the platform 26. The cage 28 is primarily a safety feature used to keep the vehicle operator and passenger on the platform in place during vehicle motion. The cage 28 includes a removable webbing gate 30 which the vehicle operator can close or open as desired. However, the gate 30 is preferably interlocked with the controls such that the gate 30 must be closed in order to operate either the lift mechanism 24 or move the vehicle 10.

Figure 2:
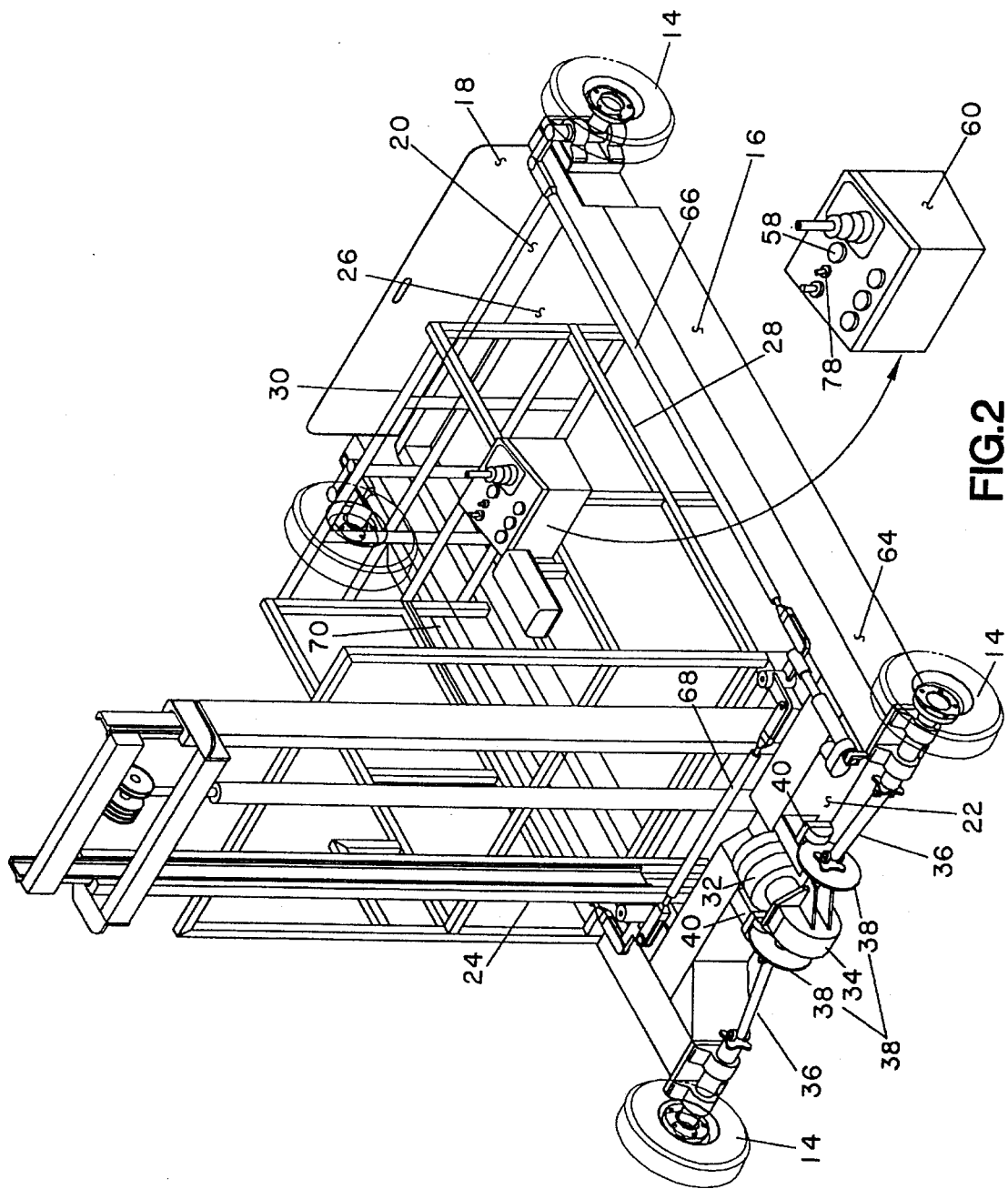
FIG. 2 is a rear perspective view of the vehicle shown in FIG. 1 with the platform in the lowered position and the drive motor cover removed.

As shown in FIGS. 1 and 2, the cage consists essentially of railings and supports with one side being shorter than the other. This design is particularly adapted for use with aircraft that have externally opening doors. It is to be understood that the cage may have equal length railing sides for use with aircraft having internally opening doors. Other sizing and spacing of the railings may be utilized depending upon the particular configuration of the aircraft for which the unit is designed. In addition, the side railings of the cage 28 may be made adjustable so that the same vehicle may be used with different aircraft designs. Alternatively, other designs of the cage 28 are envisioned without departing from the scope of the present invention. For example, the cage 28 may be a totally enclosable cabin or may have a removable shroud to cover the railings and thus protect the operator and passenger during inclement weather.

Figure 4:
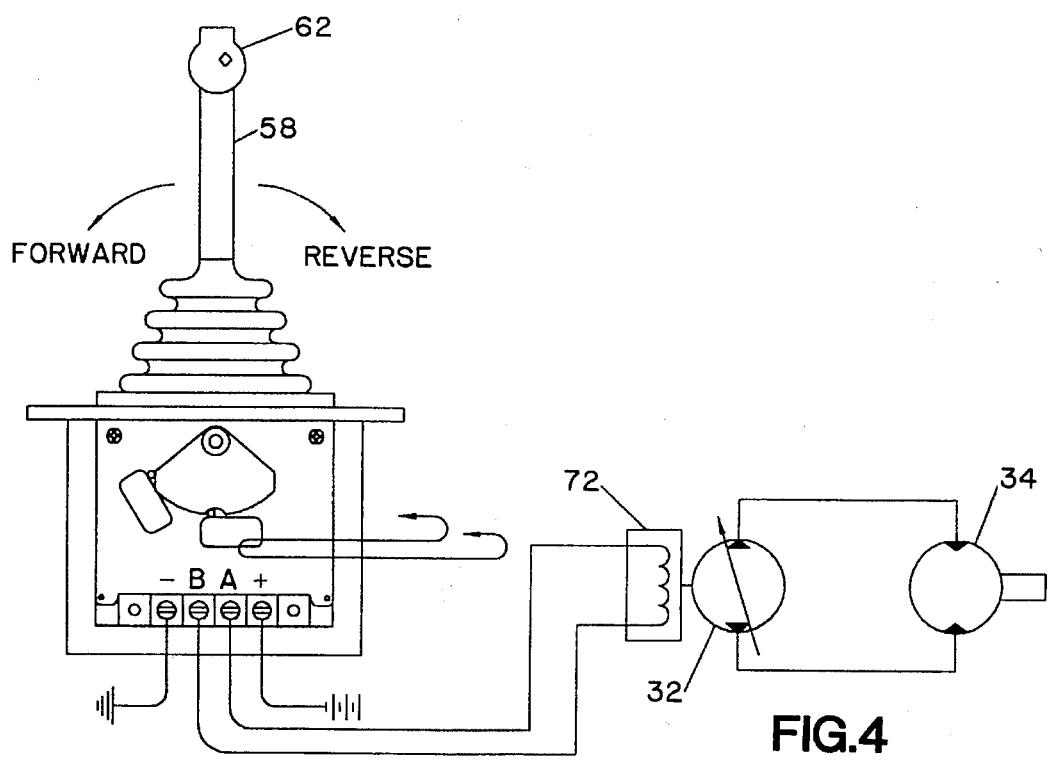
FIG. 4 is a partial simplified hydraulic schematic of the drive mechanism for the vehicle in accordance with the present invention.

As drive motor 32 shows in FIGS. 1, 2 and schematically in FIG. 4, the motor preferably comprises a DC electrical motor coupled to a variable speed hydraulic pump. The hydraulic pump is coupled through a hydrostatic transmission to a transaxle assembly 34. The transaxle assembly 34 is connected to each of the rear drive wheels 14 by an axle 36 via brake disc 38. Each of the brake discs 38 passes through a conventional disc brake caliper 40 which is fixed to the transaxle housing.

Figure 3:
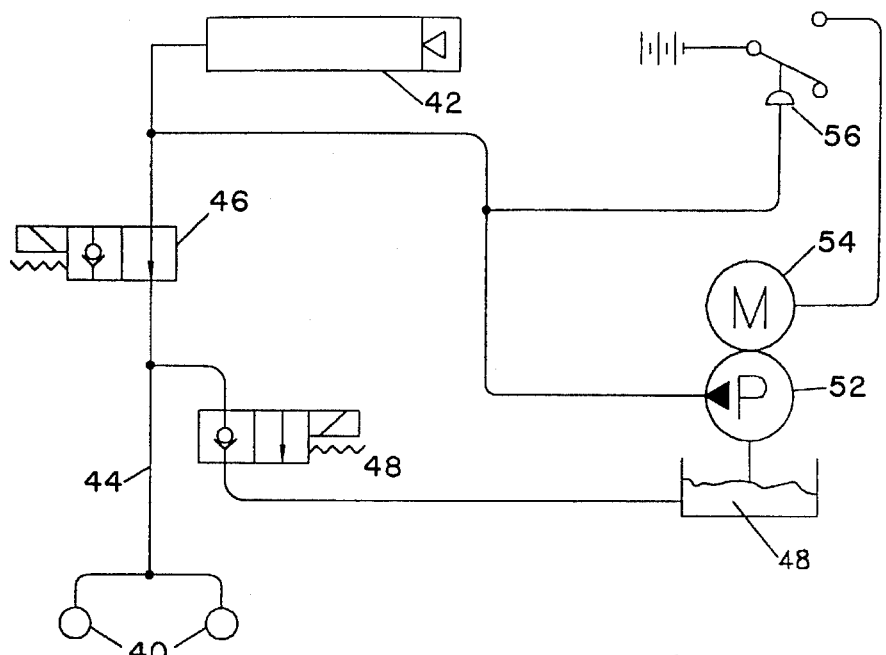
FIG. 3 is a schematic representation of the hydraulic brake control system for the vehicle in accordance with the present invention.

The brake calipers 40 are spring-set and hydraulically released. An internal spring in each caliper brakes the caliper's piston into engagement with the brake disc 38. Thus, hydraulic pressure is needed for operation, i.e. release of the brake discs. Referring now to the hydraulic schematic of FIG. 3, an accumulator 42 is connected to each of the disc brake calipers 40 via hydraulic line 44, through a first solenoid valve 46. A branch of the hydraulic line 44 is also connected to the hydraulic fluid reservoir 48 through a second solenoid valve 50.

A hydraulic pump 52, actuated by an electric motor 54 supplies hydraulic fluid to the accumulator 42. With this system, the motor 54 and pump 52 do not have to run continuously to maintain hydraulic pressure to release the brakes 40. In operation, when the ignition switch of the vehicle 10 is turned on, the solenoid valve 46 opens applying pressure from the hydraulic accumulator 42 to the calipers 40 to release the brake discs 38. At the same time, valve 48 closes to prevent fluid from going back to the hydraulic fluid reservoir 48. When the ignition switch is turned off, valve 46 closes, stopping flow from the accumulator. Valve 48 opens, allowing hydraulic pressure to bleed off from the calipers 40 through the valve 48 into the hydraulic reservoir, permitting the springs (not shown) in the calipers 40 to set the brakes.

A pressure switch 56 between the vehicle battery and the electric motor 54 on the hydraulic pump 52 is preferably set to maintain pressure in the accumulator 42 between 500 psi and 1,000 psi. The motor 54 and pump 52 operate independently of the drive motor 32 thus providing a completely separate braking system. Note that in FIG. 3, both solenoids 46 and 50 are shown in the energized position. Therefore, upon loss of power or turning off the ignition switch, valve 46 isolates the accumulator and valve 50 bleeds off hydraulic pressure to the pump reservoir 48.

Referring now to FIG. 2, the conventional steering of the vehicle 10 in accordance with the present invention is controlled with a joystick 58 on a control panel 60 mounted to the railing of the cage 28 near the back of the platform 26. This location was shown so that the operator can stand behind the passenger, face forward, and readily guide the vehicle 10 as well as provide reassurances to the passenger. A rocker switch 62 on the top of joystick 58 is spring toggled either to the right or to the left to actuate a DC actuator 64, best shown in FIG. 2. The DC actuator 64 may be any conventional linear actuator and is preferably an Electrak Model which incorporates a ball bearing screw drive mechanism with a 4" stroke length. The DC actuator 64 operates through linkage rods 66, 68 and 70 to turn the front wheels 14 either to the left or the right.

Forward and reverse movement of the vehicle 10 in accordance with the present invention is controlled by moving the joystick 58 forward or back. A simplified control schematic of the drive mechanism is shown in FIG. 4 and in more detail in FIG. 5. The motor 32 is a wobble plate variable speed hydraulic pump whose speed is determined by the position of the joystick 58. Joystick 58 operates a potentiometer between terminals "A" and "B" which determines the current to the electrical displacement control coil 72. The wobble plate pump motor provides fluid pressure through the hydrostatic transmission to the transaxle 34 in a 30:1 ratio.

FIG. 1 shows the platform 26 and cage 28 in the raised position, exposing a leading edge portion 74 of the platform 26. The leading edge portion 74 includes a flexible pressure sensitive rubber bumper 76 mounted thereto which encloses a tape switch for sensing contact with any object. A suitable bumper 76 is made by Tapeswitch Corporation, Sensing Bumper Model SE45.

Figure 5:
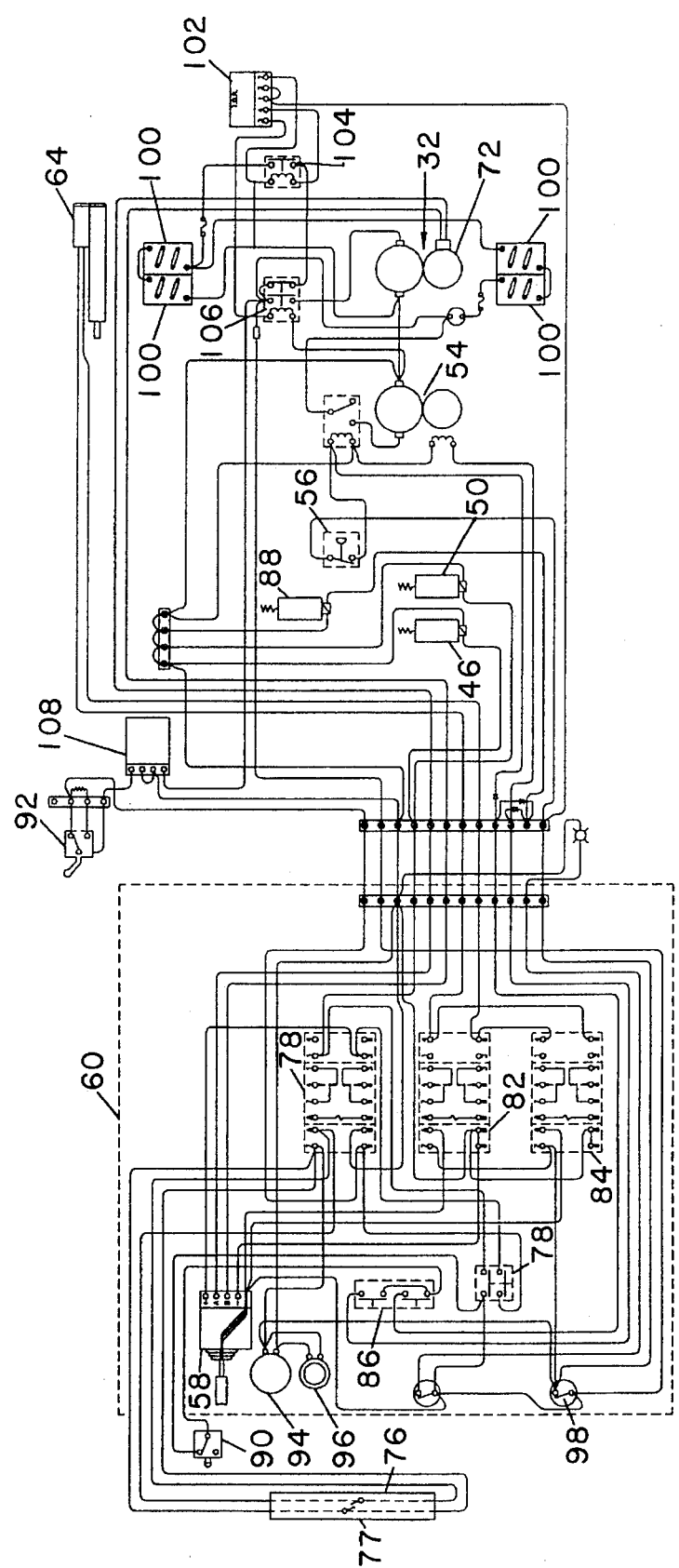
FIG. 5 is an electrical schematic of the control system for the vehicle in accordance with the present invention.

Referring now to the electrical schematic shown in FIG. 5, the bumper 76 essentially has a set of normally open contacts represented at 77 positioned internally along its length. When the bumper is compressed, typically less than ½", the electrical contacts contained therein are closed. When these contacts close, a relay 78 in the control panel 60 is energized, opening contacts in series with power to the solenoid valves 46 and 50. Solenoid valves 46 and 50 then deenergize and change positions, bleeding hydraulic fluid as above described from the disc brake calipers 40 to the hydraulic reservoir 48 and thus allowing the springs to set disc brakes. Simultaneously, the deenergization of the relay also opens contacts in series with power to the joystick 58 and therefore the current to the EDC coil 72 to deenergize the drive motor 32 and thus stop forward movement of the vehicle 10 regardless of the forward or reverse position of the joystick 58.

An override switch 80 is provided on the control panel 60 which temporarily overrides or bypasses the contacts in the bumper 76 to permit the operator to disengage the brake calipers 40 and back the vehicle 10 away from the aircraft. This override switch 80 is preferably a pushbutton, spring return switch which must be held down until the vehicle has been moved out of contact with the aircraft fuselage.

The joystick 58 controls the current to the EDC coil 72. A spring-loaded rocker control switch 62 mounted on the top of the joystick 58 controls energization of either relay 82 or relay 84 in the control panel 60 to steer the vehicle 10. When relay 82 is energized, DC power is fed to the linear actuator 64 to turn the front wheels 14 in one direction. When relay 84 is energized, the linear actuator 64 is energized with the opposite polarity, thus reversing movement of actuator 64 to turn the steering wheels in the reverse direction. Thus relays 82 and 84 are energized through the linear actuator 64 in either the in or the out direction in order to turn the wheels right or left.

The electric motor 54 coupled to hydraulic pump 52 supplies hydraulic fluid to the accumulator 42 in the brake circuit and also drives the lift piston in the elevating mechanism 24. Motor 54 is bidirection. A spring-loaded up/down switch 86 mounted on the control panel 60 is used to energize motor 54. At the same time, a solenoid valve 88 directs hydraulic fluid from pump 52 either to the accumulator 42, if pressure had dropped below 500 psi, or to the lift mechanism 24.

Electric motor 54 and hydraulic pump 52 thus serve a dual function, that of maintaining the pressure in accumulator 42 for the brake mechanism and providing hydraulic pressure to the main lift cylinder in the elevating mechanism 24. If the accumulator 42 is being charged by the lift motor 54 and pump 52 at the same time that either an up or a down command is entered via switch 86, the elevating mechanism 24 will remain stationary until the pressure switch 56 opens, permitting solenoid valve 88 to energize and direct the hydraulic fluid output of pump 52 to the lift cylinder. Thus, the refill of accumulator 42 takes precedence over either raising or lowering of the elevating mechanism 24.

The elevating mechanism 24 will also not operate unless the webbed gate 30 is closed as is shown in FIGS. 1 and 2. The closure of webbing gate 30 closes contact switch 90 to permit the lift motor 54 to be energized in response to the position of the elevation control switch 86.

The field voltage to the drive motor 32 is applied in a two-step manner from 12 volts to 24 volts to limit the applied current. A time delay relay 102 actuates relays 104 and 106 to provide the necessary few second delay when the ignition switch 98 is turned on.

The ground speed of the vehicle 10 via drive motor 32 is approximately 4 mph while the platform 26 is in the lowered position. When the platform is raised to approximately 3' in height, a limit switch 92 is activated to change the motor field voltage through voltage control 108. This change limits the maximum ground speed to ½ mph.

The vehicle 10 in accordance with the present invention is preferably powered by four heavy-duty 6-volt batteries 100 connected in series to yield a 24-volt DC supply with a 580 amp/hour capacity. However, it is to be understood that other voltages and amp/hour requirements may be utilized and still be within the scope of the present invention.

The control panel is also preferably provided with a voltmeter 94 and an elapsed hours meter 96. The meters become operational when the ignition switch 98 is turned on.

The vehicle 10 in accordance with the present invention is preferably designed to raise the platform 26 in excess of 10' from the ground via elevational mechanism 24. The vehicle 10 is also designed specifically to meet Federal Aviation Administration requirements of a 90 mph wind while remaining stable. The operator stands on the platform 26 with the wheelchair passenger during vehicle operation and thus will have an excellent view for driving the vehicle and for aligning the lift platform 26 with the aircraft door. Having the operator on the platform with the wheelchair passenger will also contribute to a feeling of security and may have a calming effect on the wheelchair passenger.

Referring back to FIG. 1, ramp plates 18 and 20 are manually tilted up as shown prior to movement of the vehicle 10. Alternatively, another electric or hydraulic actuator system may be provided to remotely tilt these plates prior to vehicle operation. These plates remain between the front wheels when the elevating mechanism 24 operates to raise the platform 26. Thus, when the platform is in the lowered position, as shown in FIG. 2, the ramp plates are forward of and protect the bumper 76 on the front edge portion 74 of the platform 26.

It is to be understood that the above-described embodiment of the invention is illustrative only. Modifications throughout may occur to those skilled in the art. Accordingly, it is intended that the invention is not to be limited to the embodiment disclosed herein but is defined by the scope and meaning of the appended claims. All patents, patent applications and other documents specifically referred to above are incorporated herein by reference in their entirety.

I claim:

1. A self-propelled passenger lift vehicle for transporting a passenger between a first location and a second location and raised elevation against an aircraft fuselage adjacent an aircraft door, said vehicle comprising in combination:

a frame having a plurality of rotatable wheels supporting said frame on a surface;

a generally horizontal platform movably mounted on said frame, said platform having a leading edge portion and a support portion for supporting said passenger;

a drive motor connected to at least one of said wheels through a transaxle assembly for moving said vehicle from said first location to said second location, said assembly including a brake mechanism connected at least to said one wheel for controllably stopping and preventing wheel rotation;

an elevating mechanism mounted on said frame and connected between said frame and said platform for controllably raising and lowering said platform between said first and second elevations; and a position sensing device in said leading edge portion of said platform for sensing the presence of said aircraft fuselage, said device being operable to automatically apply said brake mechanism to stop rotation of said at least one drive wheel upon sensing contact with said fuselage.

2. The vehicle according to claim 1, wherein said position sensing device is a pressure sensitive electrical switch having a pair of electrical contacts therein.

3. The vehicle according to claim 2, wherein said brake mechanism comprises a hydraulically released, spring actuated disc brake caliper mounted on said transaxle assembly, a pressurized hydraulic fluid supply connected to said caliper through a supply line, and an electrical solenoid valve in said supply line operable to isolate said supply from said caliper and release hydraulic fluid from said caliper when deenergized.

4. The vehicle according to claim 2, wherein said drive motor is an electrically operated hydraulic motor.

5. The vehicle according to claim 3, wherein said contacts are electrically connected to said solenoid valve.

6. The vehicle according to claim 2, wherein said contacts are connected to said brake mechanism and said drive motor so as to deenergize said motor automatically when said brake mechanism is actuated.

7. The vehicle according to claim 2, wherein said leading edge portion comprises a flexible cushion affixed to said support portion of said platform, said cushion having a cavity therein containing said position sensing device.

8. The vehicle according to claim 7, wherein said cushion is a hollow rubber sleeve.

9. The vehicle according to claim 3, wherein said drive motor is connected to two of said wheels through said transaxle assembly and said brake mechanism includes another hydraulic brake caliper mounted on said transaxle assembly, each of said calipers being operable to stop rotation of one of said wheels.

10. A self-propelled passenger lift vehicle for transporting a mobility impaired passenger between a first location and first elevation and a second location and second elevation against an aircraft fuselage adjacent an aircraft door, said vehicle comprising in combination:

a frame having a plurality of rotatable wheels supporting said frame on a surface;

a generally horizontal platform movably mounted on said frame, said platform having a leading edge portion and a support portion for supporting said passenger;

drive motor means connected to at least one of said wheels for moving said vehicle from said first location to said second location;

brake means connected to said at least one wheel for controllably stopping and preventing wheel rotation; and position sensing means in said leading edge portion of said platform for sensing the presence of said aircraft fuselage, said position sensing means being operable to automatically actuate said brake means to lock said at least one drive wheel upon sensing contact with said fuselage.

11. The vehicle according to claim 10, further comprising an elevating means mounted on said frame and connected between said frame and said platform for controllably raising and lowering said platform between said first and second elevations.

12. The vehicle according to claim 10, wherein said drive means is an electrically powered hydraulic motor connected to a pair of said wheels through a transaxle assembly.

13. The vehicle according to claim 12, wherein said brake means is a pair of hydraulically released, spring actuated disc brake calipers mounted on said transaxle assembly operable to each stop rotation of one of said pair of wheels, a pressurized hydraulic fluid supply connected to said calipers through a supply line, and an electrical solenoid valve in said supply line operable to isolate said supply from said calipers and release hydraulic fluid from said calipers when deenergized.

14. The vehicle according to claim 13, wherein said position sensing device is a pressure sensitive electrical switch having a pair of electrical contacts therein.

15. The vehicle according to claim 14, wherein said contacts are electrically connected to said solenoid valve.

16. The vehicle according to claim 15, wherein said contacts are connected to said brake means and said drive motor so as to deenergize said motor automatically when said brake means is actuated.

17. The vehicle according to claim 15, wherein said edge portion is a flexible cushion having a cavity therein containing said position sensing device.

18. A self-propelled passenger lift vehicle for transporting a mobility impaired passenger between a first location and elevation and a second location and raised elevation against an aircraft fuselage adjacent an aircraft door, said vehicle comprising in combination:

a frame having a plurality of wheels supported therefrom;

a generally horizontal platform movably mounted on said frame, said platform having a leading edge portion and a support portion for supporting said passenger;

an electrically operated hydraulic drive motor connected to two of said wheels through a transaxle assembly for moving said vehicle from said first location to said second location, said assembly including a brake mechanism comprising a pair of hydraulically released, spring actuated disc brake calipers mounted thereon and each connected to one of said two wheels for controllably stopping and preventing wheel rotation, a pressurized hydraulic fluid supply line connected to each of said calipers through a supply line, and an electrical solenoid valve in said supply line operable to isolate said supply from said calipers when deenergized;

an elevating mechanism mounted on said frame and connected between said frame and said platform for controllably raising and lowering said platform between said first and second elevations; and a position sensing device in said leading edge portion of said platform for sensing the presence of said aircraft fuselage, said device being operable to automatically deenergize said solenoid valve to apply said brake mechanism to stop wheel rotation upon sensing contact with said fuselage.

19. The vehicle according to claim 18, wherein said edge portion is a flexible cushion having a cavity therein containing said position sensing device.

20. The vehicle according to claim 19, wherein said contacts are connected to said solenoid valve and said drive motor so as to deenergize said motor automatically when said solenoid valve is deenergized.

* * * * *